United States Patent
Sasaki et al.

(10) Patent No.: US 7,894,465 B2
(45) Date of Patent: Feb. 22, 2011

(54) CHANNEL SWITCHING MULTICAST DISTRIBUTION APPARATUS AND METHOD, AND MULTICAST RECEPTION APPARATUS

(75) Inventors: Chikara Sasaki, Fujimino (JP); Teruyuki Hasegawa, Fujimino (JP); Atsushi Tagami, Fujimino (JP)

(73) Assignee: KDDI Corporation, Tokyo (JP)

( * ) Notice: Subject to any disclaimer, the term of this patent is extended or adjusted under 35 U.S.C. 154(b) by 529 days.

(21) Appl. No.: 11/827,049

(22) Filed: Jul. 10, 2007

(65) Prior Publication Data

US 2008/0013563 A1    Jan. 17, 2008

(30) Foreign Application Priority Data

Jul. 12, 2006    (JP) .............................. P2006-191462

(51) Int. Cl.
H04L 12/28    (2006.01)
(52) U.S. Cl. ...................................................... 370/432
(58) Field of Classification Search ................ 370/431, 370/390, 432
See application file for complete search history.

(56) References Cited

U.S. PATENT DOCUMENTS

| | | | |
|---|---|---|---|
| 6,847,620 B1 * | 1/2005 | Meier ........................ 370/328 |
| 7,079,504 B1 * | 7/2006 | Leung et al. ................. 370/312 |
| 7,548,995 B2 * | 6/2009 | Thukral ........................ 710/20 |
| 2003/0048808 A1 * | 3/2003 | Stahl et al. ................... 370/487 |
| 2005/0157742 A1 * | 7/2005 | Chen et al. ................... 370/432 |
| 2007/0121629 A1 * | 5/2007 | Cuijpers et al. ............. 370/390 |

FOREIGN PATENT DOCUMENTS

| JP | 2004-080785 | 3/2004 |
|---|---|---|
| JP | 2005-124193 | 5/2005 |

* cited by examiner

*Primary Examiner*—Derrick W Ferris
*Assistant Examiner*—Mang Yeung
(74) *Attorney, Agent, or Firm*—Edwards Angell Palmer & Dodge LLP; David G. Conlin; David A. Tucker

(57) ABSTRACT

A channel-switching multicast distribution apparatus in a system for providing channels by multicast. The apparatus includes a device for receiving multicast data of a first multicast group for a first channel; a device for storing the received multicast data; a delaying device for reading the stored multicast data, and delaying the data by a predetermined time; and a transmission device for transmitting the delayed data through a second multicast group for performing channel switching so as to select the first channel. Instead of the delaying device and the transmission device, a data rearranging device for reading the stored multicast data, and rearranging the data so as to change the order of packets thereof; and a transmission device for transmitting the rearranged data through a second multicast group for performing channel switching so as to select the first channel may be provided.

4 Claims, 8 Drawing Sheets

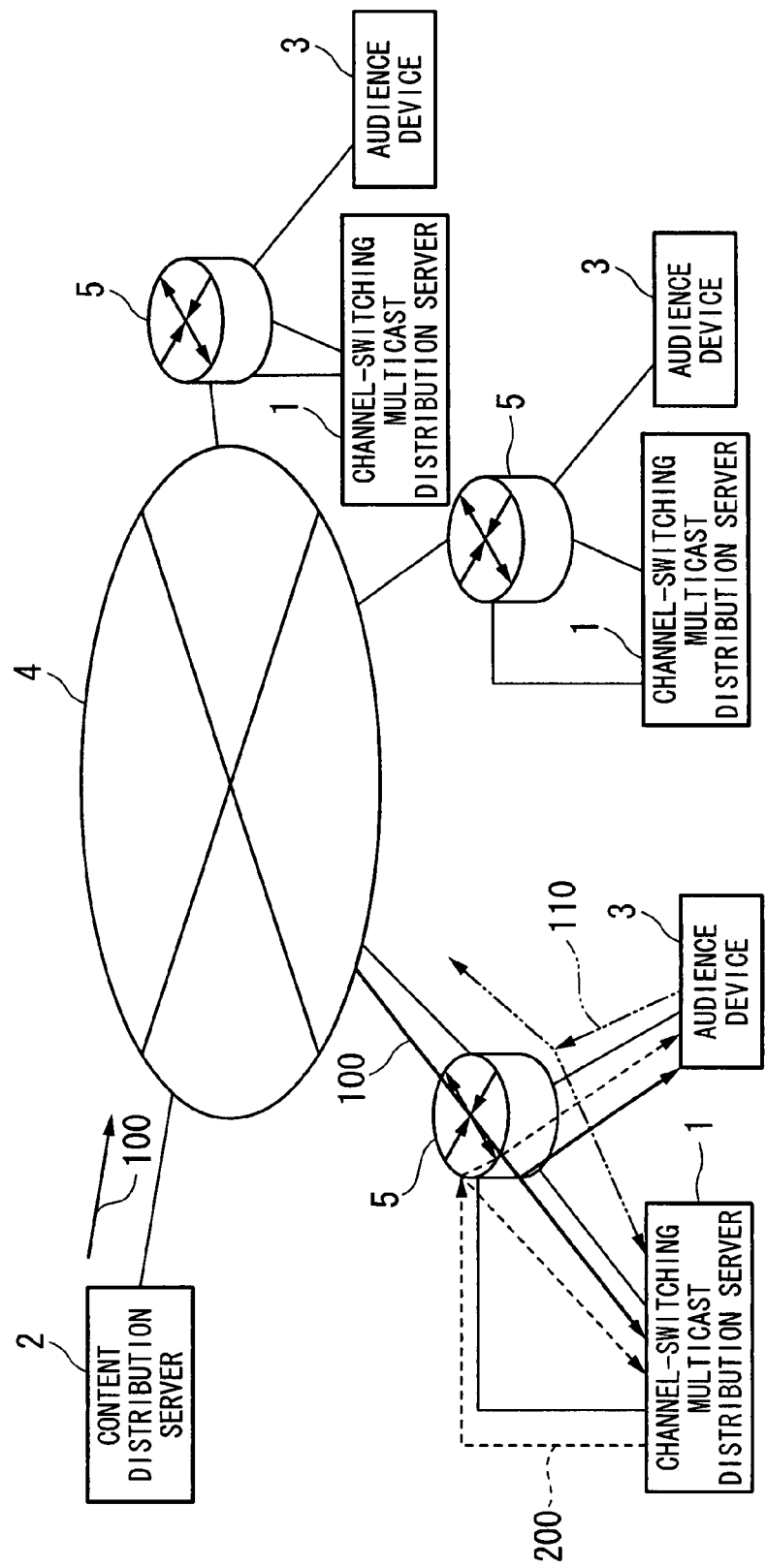

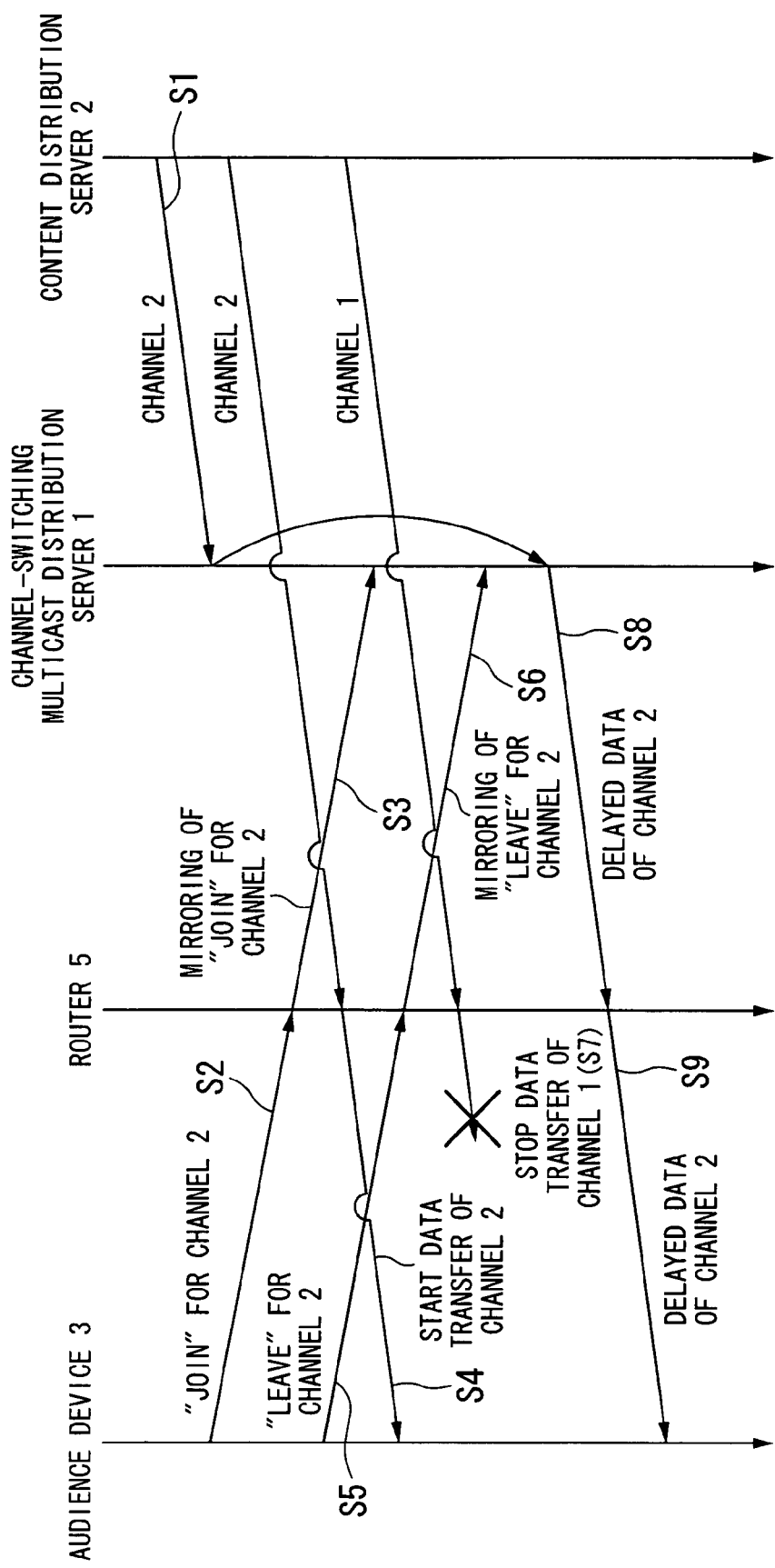

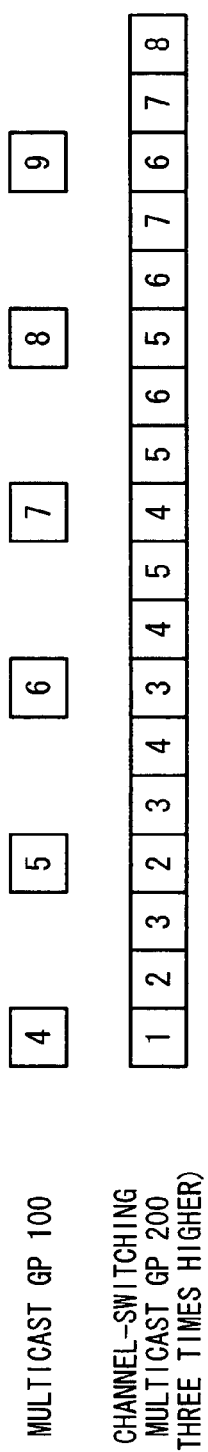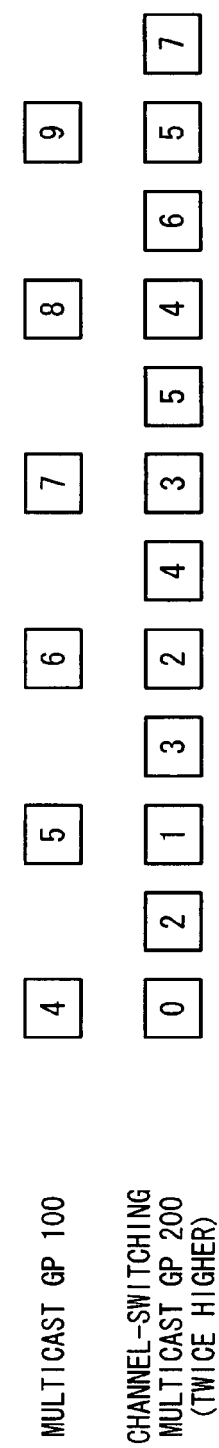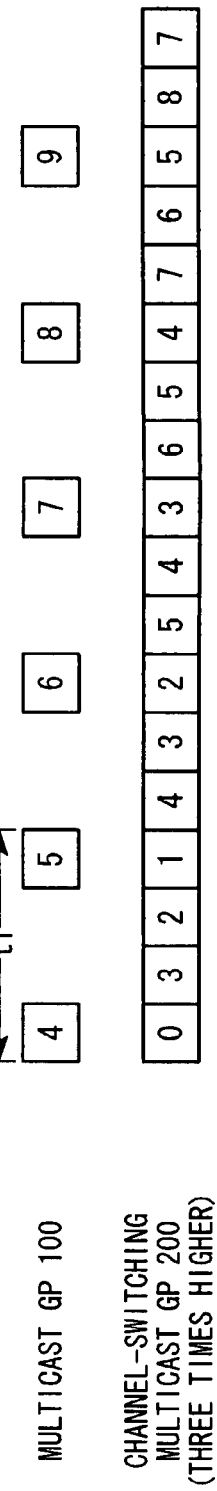

CHANNEL SWITCHING MULTICAST DISTRIBUTION APPARATUS AND METHOD, AND MULTICAST RECEPTION APPARATUS

BACKGROUND OF THE INVENTION

1. Field of the Invention

The present invention relates to a channel-switching multicast distribution apparatus, a multicast reception apparatus, and a channel-switching multicast distribution method.

Priority is claimed on Japanese Patent Application No. 2006-191462, filed Jul. 12, 2006, the content of which is incorporated herein by reference.

2. Description of the Related Art

Due to recent improvement of broadband communication networks, a demand for distributing large amounts of video content via IP (Internet protocol) networks has been increased. In such video-content distribution services, when distribution time is predetermined, the same video content can be efficiently and simultaneously distributed to a large number of audiences. For example, a telecast using the Internet (called "Internet protocol television (IPTV)" below) provides a service of simultaneously distributing a plurality of TV programs through a plurality of channels, in accordance with a TV program table (i.e., similar to distribution using broadcast waves). More specifically, different multicast addresses are assigned to the plurality of channels, so as to form a multicast group corresponding to each of the channels. In this case, channel switching is performed by joining the multicast group of a new channel which the audience wants to watch. Accordingly, the audience can select any channel via an IPTV reception device, and watch programs of any channel by freely switching channels. When switching from the channel that the audience has been watching, whether to leave the multicast group of the channel is left to the audience's decision.

However, with respect to the channel switching, delay is generated in starting the reproduction of a program in the new channel, due to necessity of data storage into the IPTV reception device, or the like. For example, (i) storage of data for decoding a digital-compression-encoded video content, (ii) storage of data for decoding error-correction codes which are used for correcting transmission errors, (iii) reproductive buffering for correcting a fluctuation in data-arrival intervals, or the like, requires a lot of time. The following Patent Documents 1 and 2 disclose channel switching techniques for executing quick channel switching.

Patent Document 1: Japanese Unexamined Patent Application, First Publication No. 2004-80785.
Patent Document 2: Japanese Unexamined Patent Application, First Publication No. 2005-124193.

However, in the above-described known channel switching techniques, the channel switching server responds individually to each channel switching request (from each audience) for selecting a new channel, and video data is sent by unicast. Therefore, an individual data sending process for channel switching (requested by each audience) should be performed. In this case, when a large number of audiences request the channel switching simultaneously, a large load is imposed on the channel switching server.

Also in the above-described known channel switching techniques, the audience must send a channel switching request for selecting a new channel to the channel switching server. Therefore, channel switching cannot be executed by a simple communication process of joining a new multicast group. Thus, the communication processing is complex.

SUMMARY OF THE INVENTION

In light of the above circumstances, an object of the present invention is to provide a channel-switching multicast distribution apparatus, a multicast reception apparatus, and a channel-switching multicast distribution method, which can (i) contribute to quick channel switching in the Internet protocol television, or the like, (ii) reduce the load imposed on the data transmission process, and (iii) simplify the communication processing.

Therefore, the present invention provides a channel-switching multicast distribution apparatus used in a system for providing a plurality of channels by multicast, the apparatus comprising:

a reception device for receiving multicast data of a first multicast group with respect to a first channel;

a storage device for storing the received multicast data of the first multicast group;

a delaying device for reading the multicast data from the storage device, and delaying the multicast data by a predetermined time; and a transmission device for transmitting the delayed multicast data through a second multicast group for performing channel switching so as to select the first channel.

The present invention also provides a channel-switching multicast distribution apparatus used in a system for providing a plurality of channels by multicast, the apparatus comprising:

a reception device for receiving multicast data of a first multicast group with respect to a first channel;

a storage device for storing the received multicast data of the first multicast group;

a data rearranging device for reading the multicast data from the storage device, and rearranging the multicast data so as to change the order of packets of the data; and a transmission device for transmitting the rearranged multicast data through a second multicast group for performing channel switching so as to select the first channel, wherein:

the transmission device transmits the multicast data of the second multicast group at a transmission speed higher than that of the first multicast group; and the data rearranging device rearranges the multicast data in accordance with the transmission speed of each multicast group.

In either channel-switching multicast distribution apparatus, the first multicast group and the second multicast group may have different multicast addresses, or have the same multicast address.

The present invention also provides a multicast reception apparatus used in a system for providing a plurality of channels by multicast, the apparatus comprising:

a reception device for receiving multicast data of a multicast group; and a storage device for storing the received multicast data, wherein:

when channel switching occurs, the reception apparatus joins a multicast group with respect to a new channel and also joins a multicast group for performing the channel switching so as to select the new channel, and receives multicast data of both groups.

The present invention also provides a multicast reception apparatus used in a system for providing a plurality of channels by multicast, the apparatus comprising:

a reception device for receiving multicast data of a multicast group; and a transfer device for transferring the received multicast data, wherein:

when channel switching occurs, the reception apparatus joins a multicast group with respect to a new channel and also joins a multicast group for performing the channel switching so as to select the new channel, and receives multicast data of both groups; and the transfer device assigns the same multicast address as that of the multicast group with respect to the new channel, to the multicast group for performing the channel switching, so as to transfer the multicast data thereof.

The present invention also provides a channel-switching multicast distribution method used in a system for providing a plurality of channels by multicast, the method comprising the steps of:

receiving multicast data of a first multicast group with respect to a first channel;

storing the received multicast data of the first multicast group; and delaying the stored multicast data by a predetermined time, and transmitting the delayed multicast data through a second multicast group for performing channel switching so as to select the first channel.

The present invention also provides a channel-switching multicast distribution method used in a system for providing a plurality of channels by multicast, the method comprising the steps of:

receiving multicast data of a first multicast group with respect to a first channel;

storing the received multicast data of the first multicast group;

rearranging the stored multicast data so as to change the order of packets of the data; and a transmitting the rearranged multicast data through a second multicast group for performing channel switching so as to select the first channel, wherein:

the multicast data of the second multicast group is transmitted at a transmission speed higher than that of the first multicast group; and the rearrangement of the multicast data is performed in accordance with the transmission speed of each multicast group.

In accordance with the present invention, it is possible to (i) contribute to quick channel switching in the Internet protocol television, or the like, (ii) reduce the load imposed on the data transmission process, and (iii) simplify the communication processing.

BRIEF DESCRIPTION OF THE DRAWINGS

FIG. 5 is a block diagram showing the general structure of an IPTV system with respect to a second embodiment of the present invention.

FIG. 6 is a process sequence chart of channel switching in the second embodiment.

FIGS. 7A to 7C are diagrams showing examples of the structure of the multicast data with respect to the channel-switching multicast Gp 200.

DETAILED DESCRIPTION OF THE INVENTION

Hereinafter, embodiments in accordance with the present invention will be described with reference to the appended figures.

Figure 1:
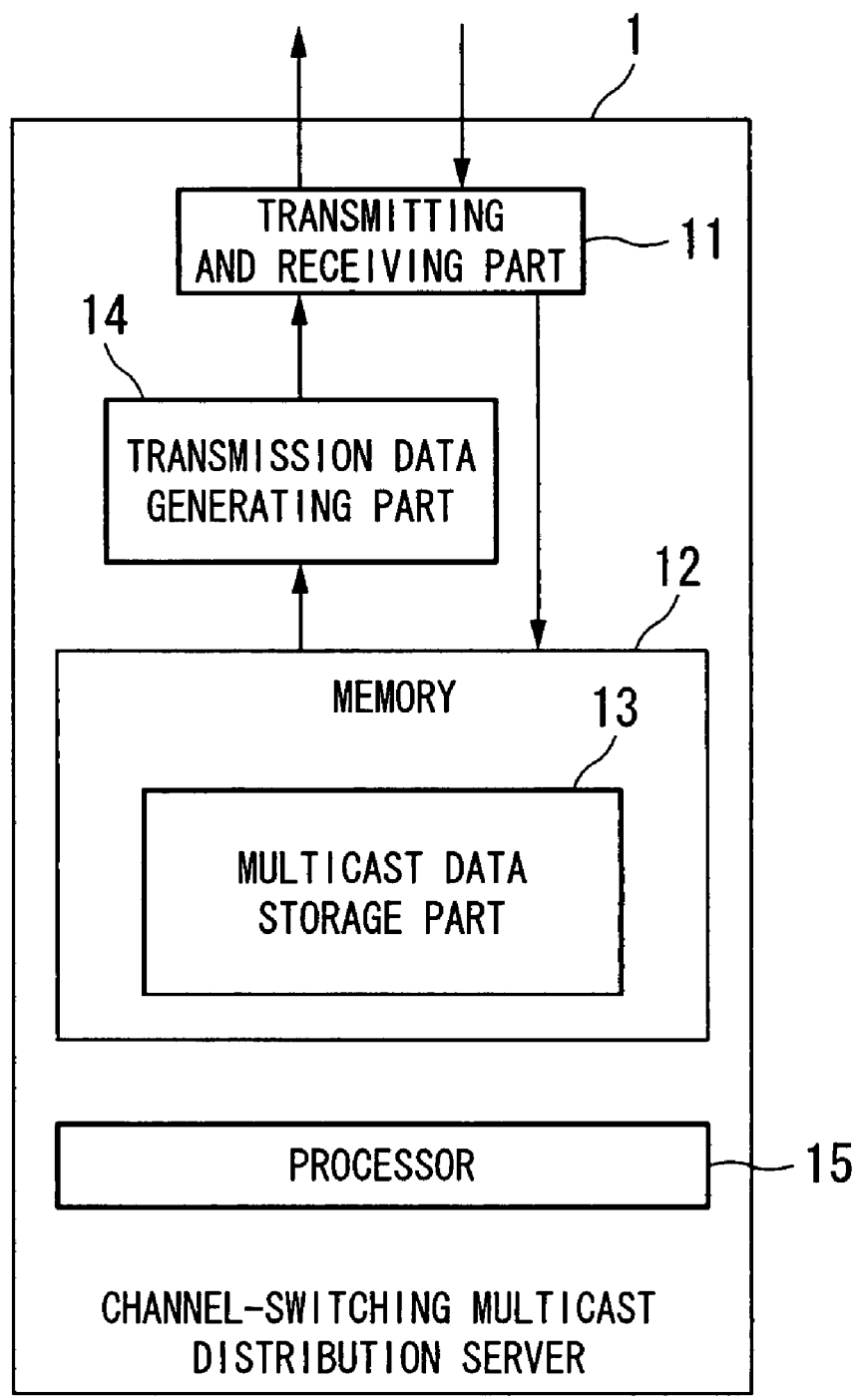
FIG. 1 is a block diagram showing the structure of a channel-switching multicast distribution server 1 as an embodiment of the present invention.

FIG. 1 is a block diagram showing the structure of a channel-switching multicast distribution server 1 as an embodiment of the present invention.

In FIG. 1, the channel-switching multicast distribution server 1 has a transmitting and receiving part 11, a memory 12, a transmission data generating part 14, and a processor 15.

The transmitting and receiving part 11 performs data transmission and reception. The memory 12 has a multicast data storage part 13, and stores multicast data, received by the transmitting and receiving part 11, into the multicast data storage part 13. The transmission data generating part 14 generates channel-switching multicast data, which is to be transmitted by the transmitting and receiving part 11, by using the multicast data stored in the multicast data storage part 13. The processor 15 performs overall control of the server 1.

Below, the channel-switching multicast distribution server 1 will be explained in detail by showing the following embodiments.

First Embodiment

Figure 2:
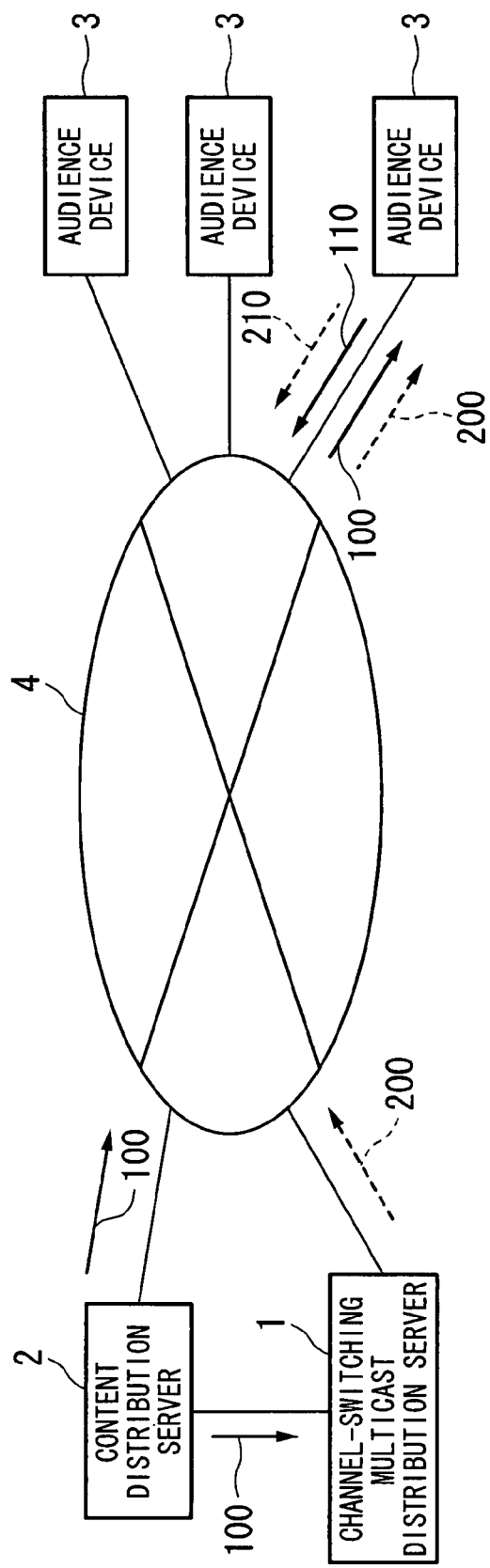
FIG. 2 is a block diagram showing the general structure of an IPTV system with respect to a first embodiment of the present invention.

FIG. 2 is a block diagram showing the general structure of an IPTV system with respect to a first embodiment of the present invention.

In FIG. 2, the channel-switching multicast distribution server 1, a content distribution server 2, and audience devices 3 are connected to a communication network 4 accommodated to IP multicast operation. In addition, the structural elements 1 to 3 and the communication network 4 are accommodated to IGMP (Internet group management protocol) which is a well-known IP multicast method.

The content distribution server 2 distributes each program, provided by the IPTV, by using a multicast group ("multicast Gp") 100 via the communication network 4 to relevant audience devices 3. The content distribution server 2 can provide a plurality of channels, and the multicast Gp 100 is assigned to each channel. The multicast Gp 100 of each channel has a unique multicast address.

The channel-switching multicast distribution server 1 directly receives data of each multicast Gp 100. However, the channel-switching multicast distribution server 1 may join any multicast Gp 100 via the communication network 4, so as to receive data of the multicast Gp 100 by way of the communication network 4.

More specifically, in the channel-switching multicast distribution server 1 of FIG. 1, the transmitting and receiving part 11 receives multicast data of each multicast Gp 100, and stores the data into the memory 12. The multicast data is stored in the multicast data storage part 13 in a manner such that the multicast data is distinguished for each multicast Gp 100 to which the data belongs.

The transmission data generating part 14 retrieves the multicast data of each multicast Gp 100 from the memory 12, and generates multicast data of a channel-switching multicast Gp 200 which corresponds to the relevant multicast Gp 100. Each channel-switching multicast Gp 200 has a unique multicast address, distinguished from the multicast address of each multicast Gp 100.

The transmission data generating part 14 outputs the generated multicast data to the transmitting and receiving part 11 after a specific amount of time (delay time) has passed. The transmitting and receiving part 11 transmits the multicast data of the channel-switching multicast Gp 200 to the communication network 4.

Each audience device 3 sends a "join" command 110 for joining a target multicast Gp 100 to the communication network 4, so as to receive data of the multicast Gp 100. When a channel switching event occurs, the audience device 3 sends, not only the "join" command 110 for joining the multicast Gp 100 of a new channel, but also a "join" command 210 for joining the channel-switching multicast Gp 200 for selecting the new channel. Accordingly, the audience device 3 receives data of the multicast Gp 100 of the new channel and also data of the channel-switching multicast Gp 200 for selecting the new channel.

Figure 3:
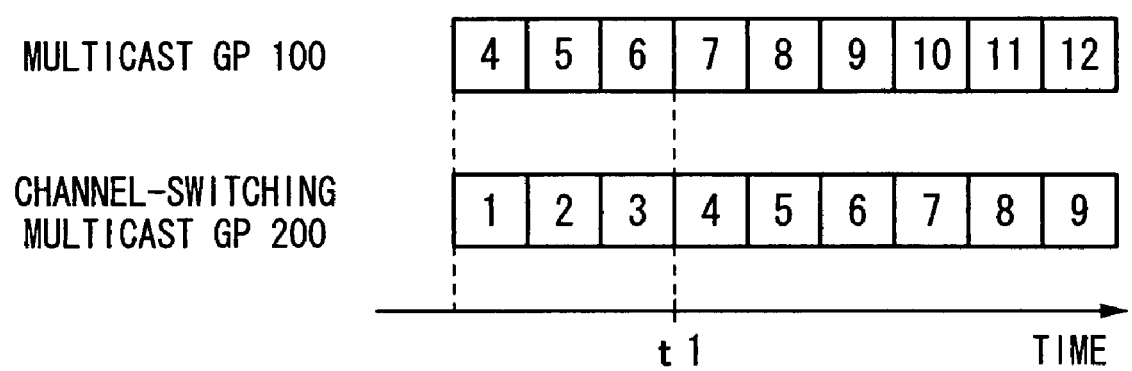
FIG. 3 is a diagram showing a relationship on a temporal axis between the multicast data of the multicast Gp 100 and the multicast data of the channel-switching multicast Gp 200 in the first embodiment.

FIG. 3 shows a relationship on a temporal axis between the multicast data of the multicast Gp 100 and the multicast data of the channel-switching multicast Gp 200 which corresponds to this multicast Gp 100. As shown in FIG. 3, the multicast data of the channel-switching multicast Gp 200 has a specific delay with respect to the multicast data of the corresponding multicast Gp 100. This delay is provided by the channel-switching multicast distribution server 1.

Therefore, each audience device 3 receives past data (by way of the channel-switching multicast Gp 200) in comparison with the data distributed using the corresponding multicast Gp 100. Therefore, when receiving the multicast data from the multicast Gp 100 and the corresponding channel-switching multicast Gp 200 in parallel, data storage for channel switching can be performed more quickly in comparison with conventional systems.

In an example shown in FIG. 3, the multicast data of the channel-switching multicast Gp 200 is delayed by three packets with respect to the multicast data of the multicast Gp 100. In FIG. 3, when the 4th to 6th packets of a new channel have been received through the multicast Gp 100 (i.e., time t1), the first to third packets of the same channel have also been received through the channel-switching multicast Gp 200. That is, in a time period necessary for receiving three packets (i.e., the 4th to 6th packets) by the multicast Gp 100, six packets in total (i.e., the 1st to 6th packets (including the packets received through the channel-switching multicast Gp 200) can be received, thereby improving the data storage speed in the audience device for channel switching. Therefore, it is possible to shorten the time for storing a specific amount of data, which is necessary for starting reproduction with respect to a new channel, and thus to shorten the waiting time until the reproduction of the new channel is started. Accordingly, it is possible to perform quick channel-switching.

In the above first embodiment, data to be stored for channel switching is transmitted by multicast. Therefore, it is unnecessary to execute an individual data transmission process with respect to the channel switching of each audience. Accordingly, even when a large number of audiences perform channel switching simultaneously, the load imposed on the server is not increased, and thus no problem occurs.

In addition, it is also unnecessary for the audience to transmit a channel switching request (for selecting a new channel) to the server, and thus channel switching can be realized by a simple process of joining a new multicast Gps.

Additionally, data to be stored for channel switching for selecting a new channel may be distributed through a plurality of the channel-switching multicast Gps 200. In this case, when each audience device 3 performs channel switching, the audience device 3 joins the plurality of the channel-switching multicast Gps 200 assigned to the same channel, thereby more quickly storing data for channel switching. Therefore, it is possible to further reduce the waiting time until the reproduction with respect to the new channel is started.

Figure 4:
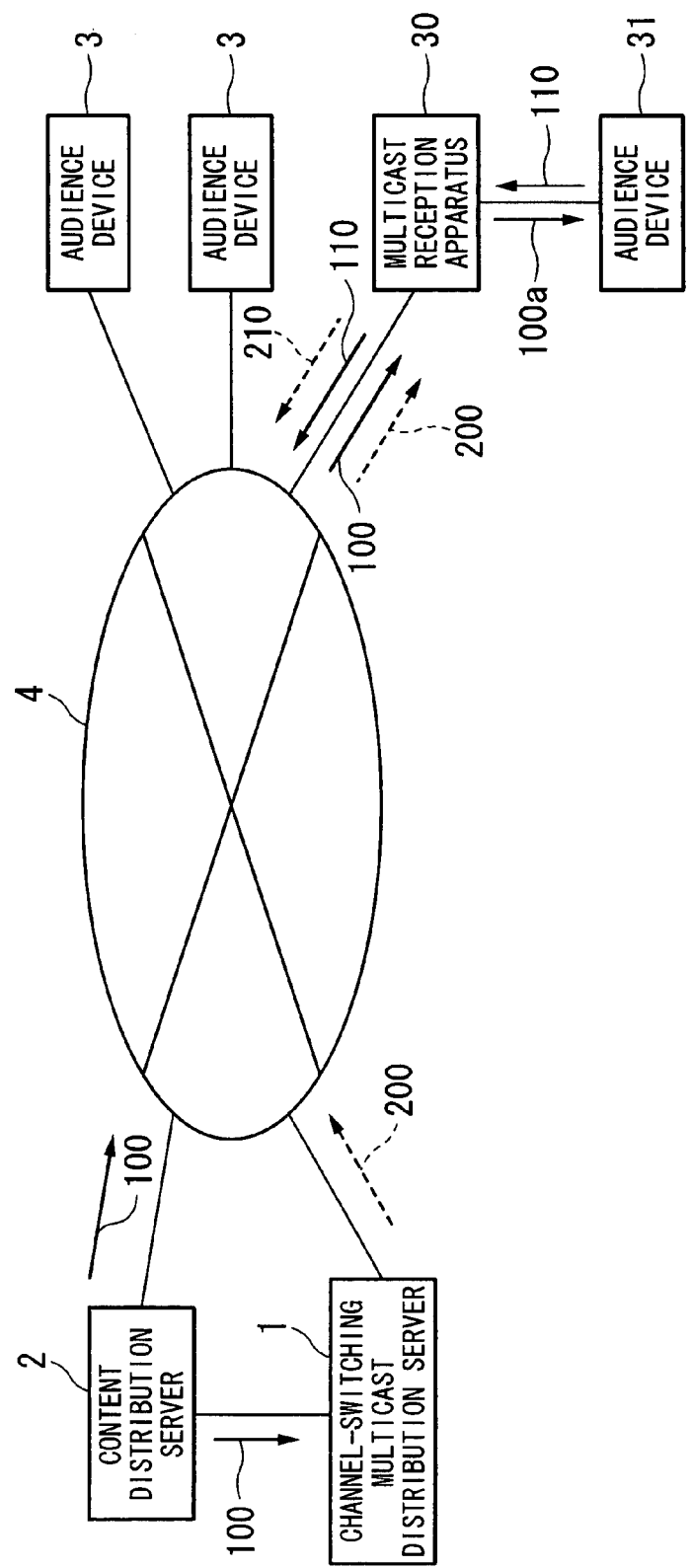
FIG. 4 is a block diagram showing a variation of the IPTV system with respect to the first embodiment.

Below, a variation of the first embodiment will be shown with reference to FIG. 4. In the structure of FIG. 4, a combination of a multicast reception apparatus 30 and an audience device 31 is provided for audience use. When a channel-switching event occurs, the audience device 31 sends only the "join" command 110 for joining the multicast Gp 100 of a new channel. When the multicast reception apparatus 30 receives this "join" command 110, the multicast reception apparatus 30 sends the "join" command 110 and also a "join" command 210 for joining the channel-switching multicast Gp 200 for selecting the new channel, to the communication network 4. Accordingly, the multicast reception apparatus 30 receives multicast data of both the multicast Gp 100 of the new channel and the channel-switching multicast Gp 200 for selecting the new channel.

The multicast reception apparatus 30 directly transfers the multicast data of the multicast Gp 100 to the audience device 31. In contrast, the multicast reception apparatus 30 changes the multicast address of the channel-switching multicast Gp 200 to have the same address of the relevant multicast Gp 100, and then transfers the multicast data of the channel-switching multicast Gp 200 to the audience device 31. More specifically, in FIG. 4, multicast Gp "100a", whose multicast data is transferred to the audience device 31, is assigned to the same address of the multicast Gp 100, however, the transferred data includes multicast data of both the multicast Gp 100 and the channel-switching multicast Gp 200. Therefore, the audience device 31 can receive the multicast data of both the multicast Gp 100 and the channel-switching multicast Gp 200, only by joining the multicast Gp 100 of a new channel.

The multicast reception apparatus 30 performs a simple bridge operation in response to a disconnection request from the audience device 31, or with respect to other data communication processes.

Second Embodiment

FIG. 5 is a block diagram showing the general structure of the IPTV system with respect to a second embodiment of the present invention.

As shown in FIG. 5, in the second embodiment, each of a plurality of the channel-switching multicast distribution server 1 is connected to a router 5, which is connected to the communication network 4. The router 5 is also connected to an audience device 3.

In FIG. 5, each channel-switching multicast distribution server 1 has two ports: (i) one is for monitoring communication of the audience device 3 by way of the router 5, and receiving data, sent from the audience device 3, via the router 5, and (ii) the other is used for general communication, and is connected to a port of the router 5, which belongs to the same network segment to which a port (of the router 5) for accessing the communication network 4 belongs.

Similar to the first embodiment, the channel-switching multicast distribution server 1 delays multicast data (received by way of the multicast Gp 100) by a specific amount of time, and transmits the delayed multicast data as multicast data of the corresponding channel-switching multicast Gp 200.

However, in the second embodiment, the channel-switching multicast Gp 200 uses the same multicast address as that of the multicast Gp 100. Therefore, in order to perform channel switching, each audience device 3 can receive the multicast data of both the multicast Gp 100 and the channel-switching multicast Gp 200 only by sending the "join" command 110 for joining the multicast Gp 100 of a new channel. Therefore, communication procedure can be further simplified.

In ordinary multicast transfer, an RPF (reverse path forwarding) check is performed in each router so as to prevent a data loop. Therefore, in order to normally transfer the data of the channel-switching multicast Gp 200 via the router 5, the data should be transferred to a port (of the router 5), which belongs to the same network segment to which a port (of the router 5) for accessing the communication network 4 belongs.

In the structure of FIG. 5, the multicast data of the channel-switching multicast Gp 200, transmitted by the channel-switching multicast distribution server 1, again reaches the channel-switching multicast distribution server 1. However, actually, data transfer with respect to the channel-switching multicast Gp 200 is performed in a moment, and the data loop thereof may be disregarded.

On the other hand, in order to prevent such a data loop, the channel-switching multicast distribution server 1 may have a checking function for preventing the server from sending data which the server already sent. For example, the identifier field of the sent data may be referred to, or the channel-switching multicast distribution server 1 may transmit data (to be transferred) after marking the data. In another method, the channel-switching multicast distribution server 1 receives multicast data of the multicast Gp 100 directly via an input port of the router 5 from the communication network 4 (i.e., another input port is provided at the channel-switching multicast distribution server 1). In this method, the multicast data should be transmitted to this input port of the router 5. Thus, the channel-switching multicast distribution server 1 may send a join request to the router 5.

Below, a channel switching operation of the IPTV system shown in FIG. 5 will be explained with reference to FIG. 6.

FIG. 6 is a process sequence chart of channel switching in the second embodiment. FIG. 6 shows a case in which an audience switches the channel from Channel 1 to Channel 2. In FIG. 6, sequence parts between the content distribution server 2 and the channel-switching multicast distribution server 1 via the router 5 are omitted for convenience of explanation.

The audience device 3 first joins the multicast Gp 100 of channel 1, and receives multicast data of the multicast Gp 100 of Channel 1 by way of the router 5, so that the program of Channel 1 is reproduced (the sequence of this process is not shown). In addition, the channel-switching multicast distribution server 1 has joined the multicast Gps 100 of all channels, and thus has received multicast data of the multicast Gps 100 of all channels (including channels 1 and 2) (see step S1, in which Channel 2 among the channels is shown).

The audience then switches the target channel from Channel 1 to Channel 2. Accordingly, the audience device 3 transmits the "join" command 110 so as to join the multicast Gp 100 of Channel 2 (see step S2). This "join" command 110 is received by the router 5, and is sent from the router 5 to the channel-switching multicast distribution server 1 by means of a mirroring function of the router 5 (see step S3). In accordance with the "join" command 110, the router 5 starts to transfer multicast data of the multicast Gp 100 of Channel 2 (see step S4).

The audience device 3 also sends a "leave" command for leaving the multicast Gp 100 of Channel 1 (see step S5). This "leave" command is received by the router 5, and is sent from the router 5 to the channel-switching multicast distribution server 1 by means of the mirroring function of the router 5 (see step S6). In accordance with the "leave" command, the router 5 stops the transfer of multicast data of the multicast Gp 100 with respect to Channel 1 (see step S7).

In accordance with the "join" command 110 for joining Channel 2 (transferred from the router 5), the channel-switching multicast distribution server 1 starts to distribute multicast data of the channel-switching multicast Gp 200 of Channel 2 (see step S8), which is transferred via the router 5 to the audience device 3 (see step S9).

Accordingly, the audience device 3 receives multicast data of both the multicast Gp 100 and the channel-switching multicast Gp 200 with respect to Channel 2. Therefore, in the audience device 3, data storage speed for channel switching is improved, and a time required for storing a specific amount of data, which is necessary for starting reproduction of a new channel, is shortened, thereby performing quick channel switching.

In addition, even when a plurality of the audience devices 3 each issue the "join" command with respect to the same channel, data to be stored for channel switching is transmitted by multicast, and thus no individual data transmission process is necessary.

Additionally, when starting the distribution of multicast data of the channel-switching multicast Gp 200, the channel-switching multicast distribution server 1 starts a timer for counting a time sufficient for data storage in the audience device 3. When the counting of the timer has completed, the channel-switching multicast distribution server 1 terminates the distribution of the multicast data of the channel-switching multicast Gp 200. In this process, if the "join" command for the same channel is issued by another audience device 3 before the distribution is terminated, the channel-switching multicast distribution server 1 starts the timer again, and continues the distribution of the multicast data of the channel-switching multicast Gp 200.

In addition, the channel-switching multicast distribution server 1 manages the "join" command and the "leave" command from each audience device 3 with respect to each channel, so as to detect the channel which each audience device 3 presently selects, and to appropriately distribute the multicast data of the channel-switching multicast Gp 200. Such management is performed because the "join" command may be issued also for the channel which the audience has presently selected.

Below, variations of the multicast data structure with respect to the channel-switching multicast Gp 200 will be shown.

In the structure shown in FIG. 3, multicast data of the channel-switching multicast Gp 200 is formed only by delaying multicast data of the multicast Gp 100, that is, rearrangement of multicast data packets with respect to the multicast Gp 100 is not particularly performed. In addition, the multicast Gp 100 and the channel-switching multicast Gp 200 have the same data transmission speed. The variations are provided for increasing the data transmission speed of the channel-switching multicast Gp 200, and also for increasing the data storage speed at the audience device 3 for channel switching, by performing rearrangement of the packets.

FIGS. 7A to 7C show examples of the structure of the multicast data with respect to the channel-switching multicast Gp 200.

In FIG. 7A, the channel-switching multicast Gp 200 has a data transmission speed three times higher than that of the multicast Gp 100, and packet rearrangement is performed in accordance with the data speed of each multicast Gp. In the example of FIG. 7A, the packets are rearranged so that the 1st to 3rd packets are received through the channel-switching multicast Gp 200 in a time period in which the 4th packet is received through the multicast Gp 100. Therefore, in the time period allocated for receiving the 4th packet using the multicast Gp 100, four packets in total (i.e., the 1st to 4th packets), which include the packets received using the channel-switching multicast Gp 200, can be received and stored, thereby increasing the data storage speed four times.

In FIG. 7B, the channel-switching multicast Gp 200 has a data transmission speed twice as high as that of the multicast Gp 100, and packet rearrangement is performed in accordance with the data speed of each multicast Gp. In the example of FIG. 7B, the packets are rearranged so that the 0th to 3rd packets are received through the channel-switching multicast Gp 200 in a time period in which the 4th and 5th packets are received through the multicast Gp 100. Therefore, in the time period allocated for receiving the 4th and 5th packets using the multicast Gp 100, six packets in total (i.e., 0th to 5th packets), which include the packets received using the channel-switching multicast Gp 200, can be received and stored, thereby increasing the data storage speed three times.

In FIG. 7C, the channel-switching multicast Gp 200 has a data transmission speed three times higher than that of the multicast Gp 100, and packet rearrangement is performed in accordance with the data speed of each multicast Gp. In the example of FIG. 7C, the packets are rearranged so that the 0th to 3rd packets are received through the channel-switching multicast Gp 200 at a time (see "t1" in FIG. 7C) from the reception of the 4th packet to the reception of the 5th packet using the multicast Gp 100. Therefore, in the time from the reception of the 4th packet to the reception of the 5th packet using the multicast Gp 100, six packets in total (i.e., the 0th to 5th packets), which include the packets received using the channel-switching multicast Gp 200, can be received and stored, thereby increasing the data storage speed four times or higher (in a "burst" state).

Figure 8:
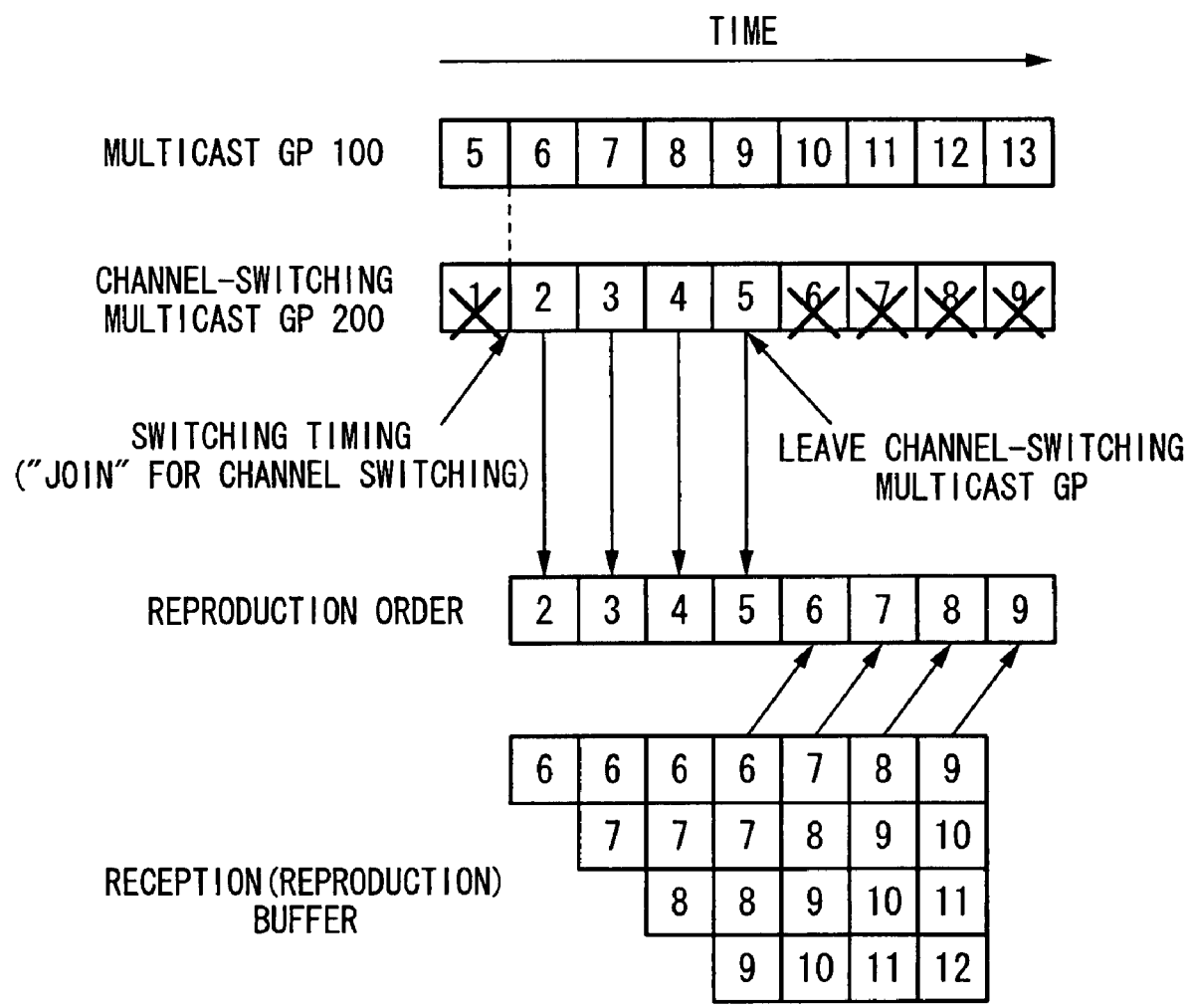
FIG. 8 is a diagram for explaining an example of the reproduction method at the audience device 3.

Below, an example of the reproduction at the audience device 3 will be explained. More specifically, a case in which the audience device 3 has a reproduction device, which starts reproduction even when having no stored data, will be explained with reference to FIG. 8 (for explaining an example of the reproduction method at the audience device 3). In FIG. 8, the channel-switching multicast Gp 200 has the same data transmission speed as that of the multicast Gp 100, and has a four-packet delay with respect to the data of the multicast Gp 100.

In FIG. 8, the "join" command is issued from the relevant audience device 3 when the 6th packet is distributed using the multicast Gp 100. Accordingly, the audience device 3 starts data reception from the six packet using the multicast Gp 100, and simultaneously, starts data reception from the second packet using the channel-switching multicast Gp 200. The audience device 3 stores the packets (i.e., multicast data), which are received by the multicast Gp 100 and the channel-switching multicast Gp 200, into a reception (reproduction) buffer. Here, the reception (reproduction) buffer can store four packets, which are an ordinary data-storage amount for reproduction.

When the packets are stored in the reception (reproduction) buffer, the reproduction device of the audience device 3 reads the packets in turn from the oldest packet (i.e., the 2nd packet, here). Therefore, the 2nd to 5th packets, which have been received through the channel-switching multicast Gp 200, are reproduced first. During the reproduction of the 2nd to 5th packets, the 6th to 9th packets, received using the multicast Gp 100, are stored in the reception (reproduction) buffer (see FIG. 8). Therefore, the ordinary data-storage amount is maintained, and stable program reproduction can be performed.

When the audience device 3 has received four packets using the channel-switching multicast Gp 200, it leaves the channel-switching multicast Gp 200. After that, the audience device 3 receives multicast data only using the multicast Gp 100.

In accordance with the above reproduction method, when the channel is switched, relevant reproduction can be started almost simultaneously with the occurrence of the channel switching event while storing a normal data-storage amount of data for reproduction, in the reception (reproduction) buffer. The multicast Gp 100 is used for the data storage, and the channel-switching multicast Gp 200 is used for reproduction at the initial stage.

Therefore, in accordance with the present invention, both of quick channel switching and stable program reproduction can be performed.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

For example, in the above-described embodiments, the present invention is applied to the system relating to the IPTV, however, it can be applied to various systems for providing a plurality of channels using a multicast method.

What is claimed is:

1. A channel-switching multicast distribution apparatus used in a system for providing a plurality of channels by multicast, the apparatus comprising:

a reception device for receiving multicast data of a first multicast group as ordered packets of multicast data with respect to a first channel;

a storage device for storing the received multicast data of the first multicast group;

a data rearranging device for reading the multicast data from the storage device, and rearranging the multicast data by changing the order of packets of the multicast data; and a transmission device for transmitting the rearranged multicast data, in temporally parallel relation with a distribution of the multicast data of the first multicast group, through a second multicast group for performing channel switching so as to select the first channel, wherein:

the transmission device transmits the multicast data of the second multicast group at a transmission speed higher than that of the first multicast group; and the data rearranging device changes the order of the packets of the multicast data in accordance with the transmission speed of each multicast group.

2. The channel-switching multicast distribution apparatus in accordance with claim 1, wherein the first multicast group and the second multicast group have different first and second multicast addresses respectively.

3. The channel-switching multicast distribution apparatus in accordance with claim 1, wherein the first multicast group and the second multicast group have first and second respective multicast addresses that are the same as one another.

4. A channel-switching multicast distribution method used in a system for providing a plurality of channels by multicast, the method comprising the steps of:

receiving multicast data of a first multicast group as ordered packets of multicast data with respect to a first channel;

storing the received multicast data of the first multicast group;

rearranging the stored multicast data by changing the order of packets of the multicast data; and transmitting the rearranged multicast data, in temporally parallel relation with a distribution of the multicast data of the first multicast group, through a second multicast group for performing channel switching so as to select the first channel, wherein:

the multicast data of the second multicast group is transmitted at a transmission speed higher than that of the first multicast group; and the order of the packets of the multicast data is changed in accordance with the transmission speed of each multicast group.

* * * * *